Patented Aug. 11, 1942

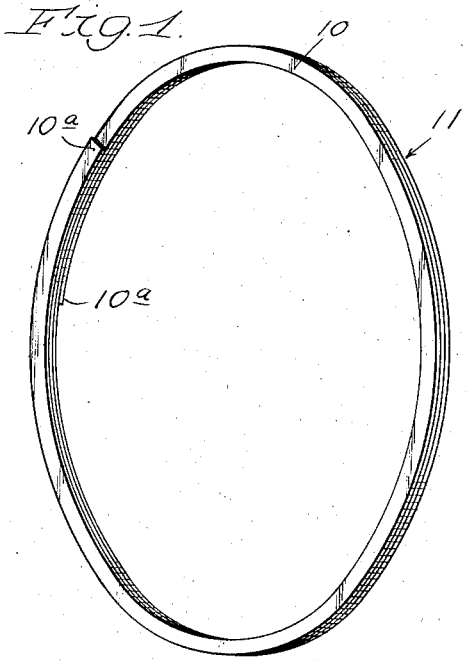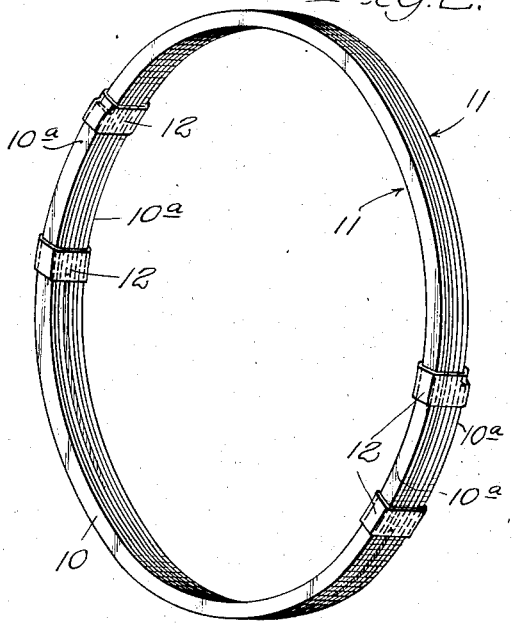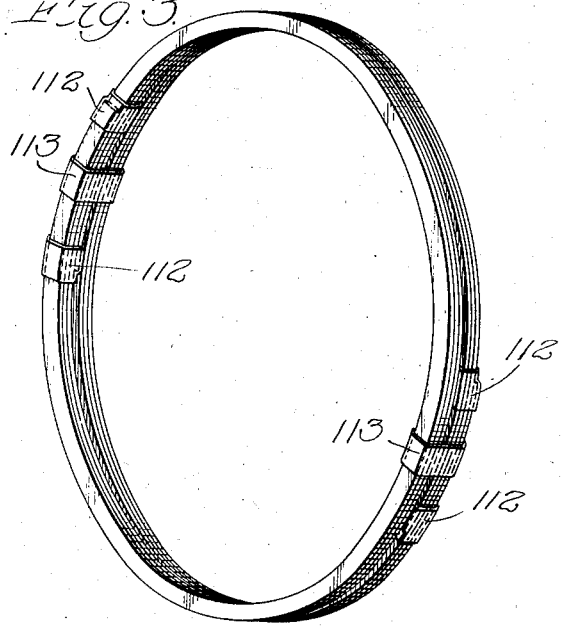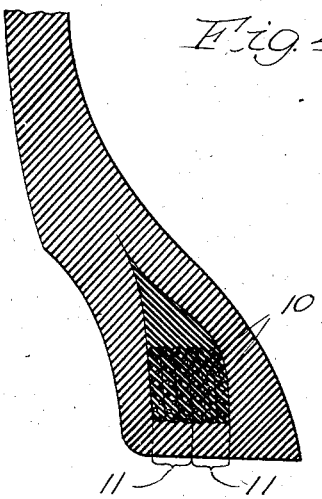

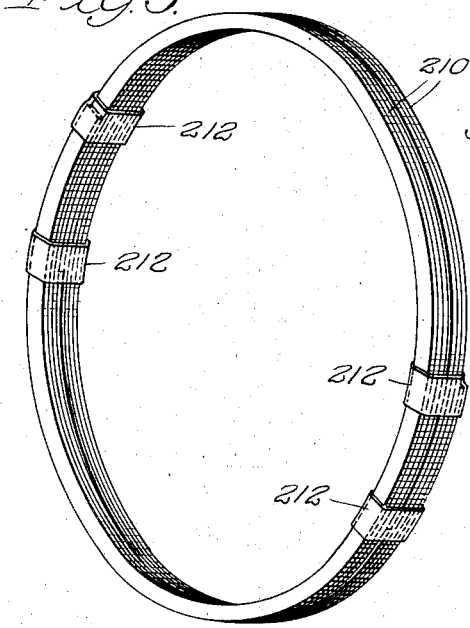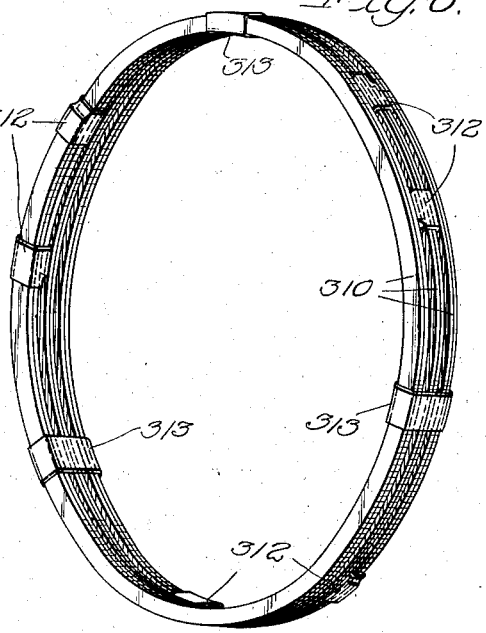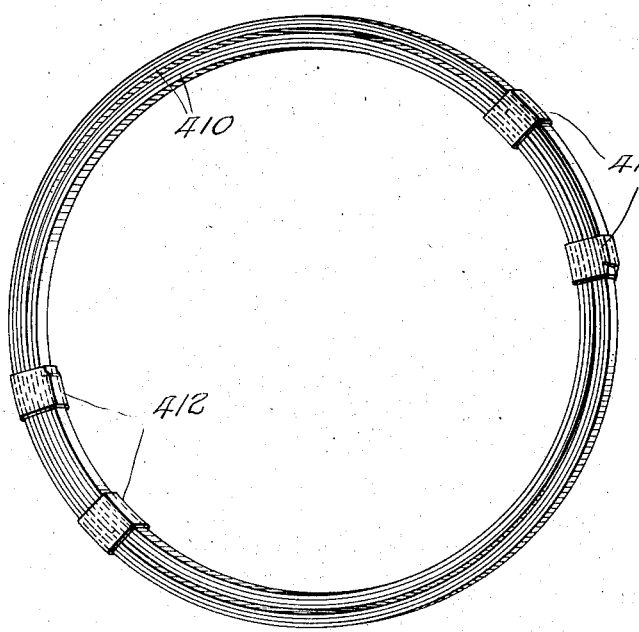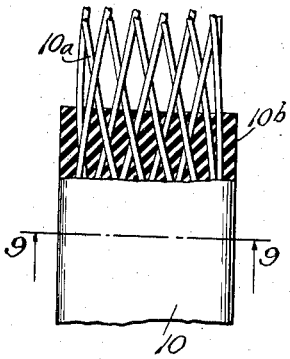

2,292,980

UNITED STATES PATENT OFFICE 2,292,980

PNEUMATIC TIRE CONSTRUCTION

John W. White, Wadsworth, Ohio, assignor to National-Standard Company, a corporation of Michigan Application June 4, 1941, Serial No. 396,619

2 Claims. (Cl. 152—362)

This invention relates to improvements in pneumatic tire construction and more especially the bead reenforcement thereof.

It has been common practice to place an annulus or grommet in the bead of a pneumatic tire for reenforcement purposes. Such reenforcements have commonly been formed of various kinds of tension members such as wires, cables, tapes, braids and the like. Some examples of known reenforcing members are shown in the following patents: 1,512,796 and 1,670,044, Pierce, October 21, 1924, and May 15, 1928; 1,749,899, Alderfer, March 11, 1930, and 1,903,925, Johnson, April 18, 1933.

It has been common practice to take a length of the tension member, wind the same into one or more convolutions to form the grommet or annulus, overlap and fasten the ends. It is preferable to overlap the ends so that the grommet will have substantially the same strength at the splice that it has elsewhere. In the Shook application referred to above, the annulus is formed of a braided wire tape wound on edge, that is, with the convolutions lying side by side. When a flat tape is used and wound flatwise, the convolutions lie one on top of the other.

It will be seen that in all cases where such a grommet or annulus is formed of a single tension member and the ends overlap at the joint or splice, the reenforcement will have extra weight at this point. That is, the overlapping ends cause abnormal weight. If the ends are not overlapped the grommet is weaker at this point than elsewhere. Such extra weight has proven objectionable because it throws the tire out of balance.

The particular feature of my invention contemplates the elimination of extra weight at any one point in each bead. I accomplish this by employing two or more grommets with the splices thereof equally spaced throughout the 360° of the tire. For example, I may employ two grommets with the splices 180° apart, or I may employ three grommets with the splices 120° apart, and so on.

My invention is better adapted for use in connection with a grommet formed of a flat tape wound on edge as shown, than in connection with a grommet formed of a flat tape wound flatwise. With the tape wound on edge I can place two or more grommets side by side so that each will have substantially the same diameter. My invention, however, could be used with practically any kind of grommet. Even with a grommet formed with a flat tape wound flatwise it would be possible to employ two or more grommets, one outside of the other with the splices equally spaced throughout the 360° of the tire. In such construction, however, the splices on the outer grommets would be radially more distant from the center of the tire than the others. This might cause some unbalance but this could be compensated for by increasing or decreasing the extra weight at each splice by increasing or decreasing the extent of the overlap of the ends.

For the purpose of illustration, I have here shown my invention embodied in a reenforcement comprising a plurality of grommets each formed of a flat braided wire tape wound on edge, the grommets being placed side by side, and the splices of the grommets being equally spaced around the circumference of the tire.

Other features and advantages of my invention will appear more fully as I proceed with my specification.

In those forms of device embodying the features of my invention illustrated in the accompanying drawings, Fig. 1 is a view of one grommet formed of three convolutions of a braided wire tape coated with rubber, with the ends overlapped but not yet wrapped to complete the splice; Fig. 2 is a view in perspective of two of these grommets side by side with the ends wrapped to complete the splices; Fig. 3 is a similar view showing two grommets side by side in which each grommet has its own splice; Fig. 4 is a vertical sectional view through the bead of a tire having the reenforcements of Fig. 2 or Fig. 3; Fig. 5 is a view in perspective of a reenforcement comprising two grommets having three and four convolutions, respectively; Fig. 6 is a similar view showing a reenforcement with three grommets each having two convolutions; Fig. 7 is a similar view showing a reenforcement made of two grommets each formed of a flat tape wound flatwise with one grommet outside of the other; Fig. 8 is a fragmentary view of the tape with a portion broken away; and Fig. 9 is a view taken as indicated by the line 9 of Fig. 8.

As shown in the drawings, 10 may indicate a tension member, for example a braided wire tape covered with rubber as shown in Figs. 8 and 9. As shown in Fig. 1, a grommet 11 is formed by winding three convolutions of such a tape on edge, the convolutions lying side by side. The ends 10a, 10a are overlapped as shown.

As shown in Fig. 2, two grommets of the form shown in Fig. 1 are placed side by side with the splices 180° apart. The splices are then completed by winding tape 12 around the two grommets together to cover the ends 10a, 10a and hold them securely in place. If desired, as shown in Fig. 3, the splice on each grommet may be made independently of the other. This would amount to winding two pieces of tape 112, 112 around the grommet shown in Fig. 1 and then making a duplicate of this and placing the two grommets side by side as shown in Fig. 3 with the splices 180° apart. Any suitable means such as two extra pieces of tape 113 may be employed to hold the two grommets together until the tire construction is completed in the event this is deemed desirable.

The completed reenforcement, in each case comprising two grommets, as shown in Fig. 2 or Fig. 3, is incorporated in the bead of a tire in the usual manner; and a cross-section through the completed bead would appear substantially as shown in Fig. 4.

In Fig. 5 I have shown two grommets side by side, one having three convolutions and the other four convolutions of a tension member with the splices spaced 180° apart. This construction can be employed if it is desired to have seven convolutions of a tension member in the completed bead.

It is also possible to employ more than two grommets. For example, as shown in Fig. 6, I have shown a reenforcement comprising three grommets, each having two convolutions. Here the splice on each grommet is independent of the others; and the three splices are spaced 120° apart around the circumference of the tire. Small pieces of extra tape 313 may be employed to hold the grommets together.

It is also possible to use the invention in connection with grommets made of tape wound flatwise, for example as shown in Fig. 7. There are two grommets, one inside of the other, each formed of three convolutions of tape. Here the splices are formed by winding tape 412 around the two grommets together.

The construction of the flat tape 10 which is wound on edge to form the grommet is shown in Figs. 8 and 9. As here shown, the complete tape 10 is formed of a braided wire tape 10a covered with rubber 10b.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible, in view of the prior art.

What I claim as new, and desire to secure by Letters Patent, is:

1. A pneumatic tire having a bead with a reenforcement therein comprising a plurality of grommets, each grommet including one or more convolutions of a tension member with the ends overlapped to form a splice, the splices of the various grommets being equally spaced around the circumference of the tire.

2. A pneumatic tire having a bead with a reenforcement therein comprising a plurality of grommets lying side by side, each grommet including one or more convolutions of a tension member with the ends overlapped to form a splice, the splices of the various grommets being equally spaced around the circumference of the tire.

JOHN W. WHITE.